Dec. 21, 1943.  J. B. McMULLEN  2,337,120
VESSEL
Filed Feb. 19, 1940  2 Sheets-Sheet 1
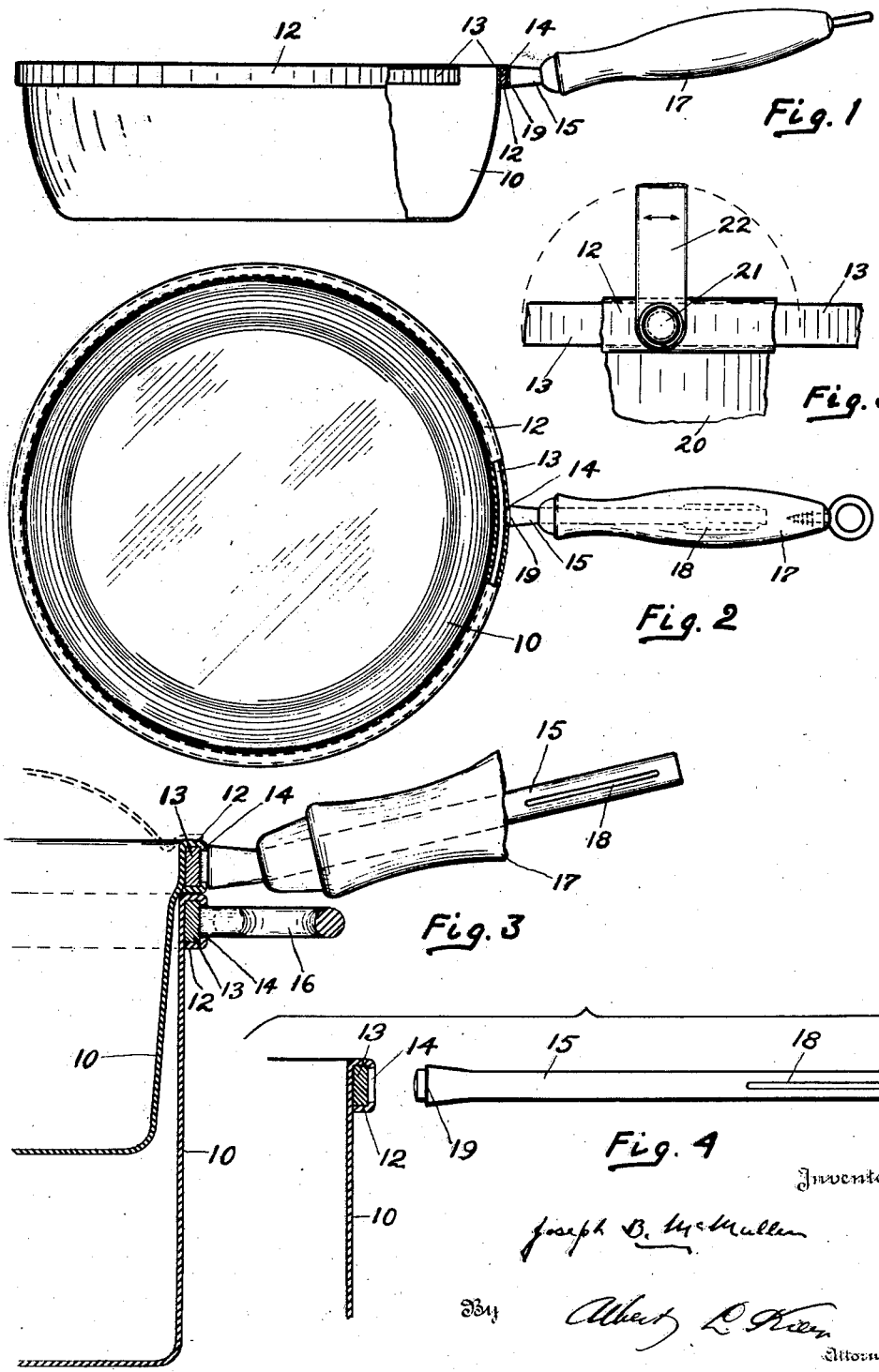

Dec. 21, 1943.                J. B. McMULLEN                2,337,120
                                  VESSEL
                            Filed Feb. 19, 1940          2 Sheets-Sheet 2
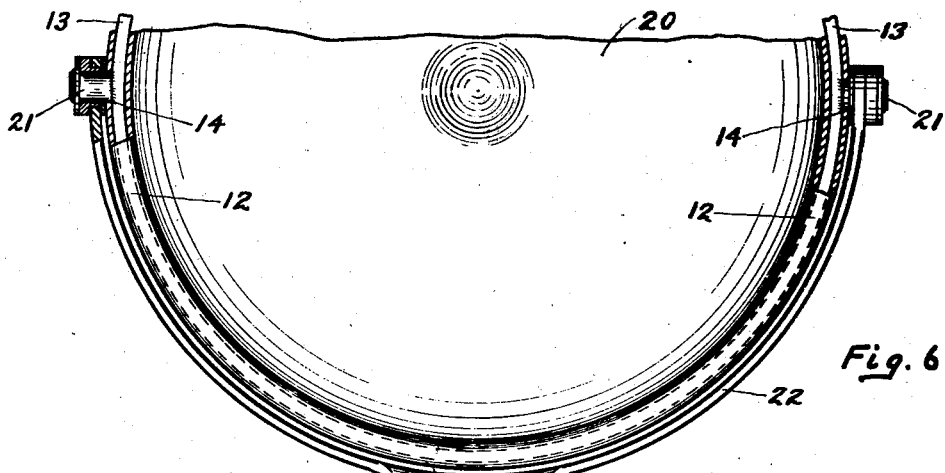
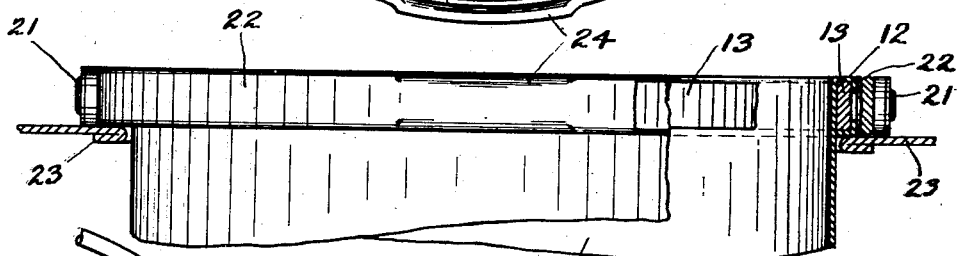
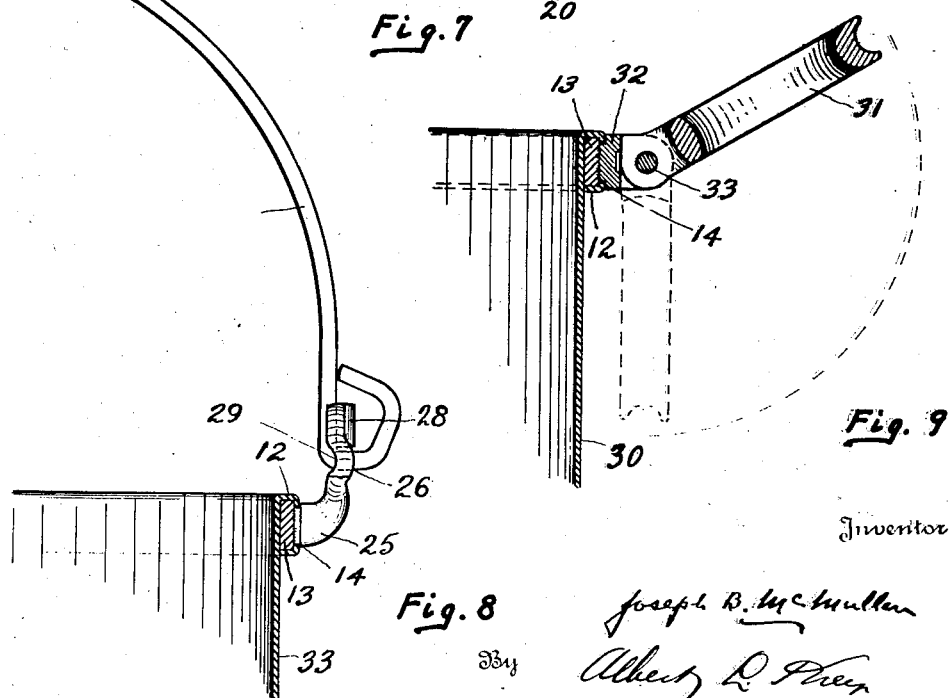
Inventor
Joseph B. McMullen
By Albert L. Ely
Attorney Patented Dec. 21, 1943

2,337,120

UNITED STATES PATENT OFFICE 2,337,120

VESSEL

Joseph B. McMullen, Washington, D. C.

Application February 19, 1940, Serial No. 319,775

2 Claims. (Cl. 220—94)

This invention relates to a method of attaching a handle or handles to utensils without the use of rivets or welding to the body or side walls of such utensils, which is the common practice in the fabrication of sheet metal utensils.

A further object of this invention is to make possible the attaching of a permanent handle to a utensil by welding means without welding the handle to the wall structure of said utensil, a process which makes possible a handle portion of one metal and the utensil of a different metal.

A further object of this invention is to provide a method of attaching a permanent handle to a segment housed in the flange of the utensil through a recess formed in the flange so as to provide a continuous upper and lower integral sealing means on said flange.

This invention further contemplates a handle attached in such manner so as to form no obstruction below the flange of the utensil, and to prevent the accumulation of food or residue in the vicinity of the handle, a fault commonly found in many types of utensils now on the market, thereby making a sanitary utensil and one that can be readily and rapidly cleaned.

This invention also contemplates a handle attached in such manner that will make possible the nesting of one utensil within the other, so that the lower portion of the flange of the nesting utensil forms a continuous seal with the upper portion of the flange of the larger utensil, thus making a very efficient double boiler.

It is a further object of this invention to provide a permanent handle attached to a utensil in such manner as to prevent any strain or weakening of the side walls of said utensil, a fault commonly found in many types of utensils now on the market, especially those having thin walls.

A further object of this invention is to provide a nontwisting handle that will stand the usage of time and heat, thereby remedying a fault commonly found in many types of cooking utensils now on the market.

And it is a further object of this invention to provide a utensil that can be used with steam tables, stoves and the like when such steam tables and stoves possess cavities in their tops for housing utensils, the utensil to be sunk in said cavity to a point where the lower surface of the flange of the utensil engages the top surface of the stove or steam table or adjacent thereto, thereby substantially reducing the escape of heat or steam and providing an even distribution of heat over the entire utensil below its flange. The connection of the handles to the utensil are made in such a way as to insure this sealing arrangement.

A detailed description of the invention will hereinafter be made with particular reference to the drawings in which:

Figure 1 is a side view of a utensil, partial in section adjacent to the handle.

Figure 2 is a plan view of Figure 1 partially sectioned adjacent to the handle.

Figure 3 is a sectional drawing of two utensils adjacent to their handles and illustrates the method of conversion of two utensils into a double boiler.

Figure 4 illustrates the position of the stem of the handle in a position to be welded to the segment embedded in the flange of the utensil through a recess formed in the outer wall of the flange.

Figure 5 is a side view of a portion of a utensil adjacent to its flange, showing a bucket type of handle pivoted to a lug welded to the supporting segment housed in the flange through a recess formed in the flange.

Figure 6 is a plan view of a steam table utensil, partially cut away, showing a bucket type of handle engaging the supporting segment embedded in the flange of the utensil through the medium of studs welded to the segment through recesses formed in the flange of the utensil.

Figure 7 is a side elevation of the top portion of Fig. 6 partial in section, showing the flange section of the utensil resting on the rim of the hole in a steam table or stove, with the handle folded down and lying between the upper and lower parallel surfaces of the flange of the utensil.

Figure 8 is a partial sectional view of a utensil showing a conventional bucket wire handle engaging a lug welded to the embedded segment in the flange of the utensil and having an eyelet formed in the lug shaped to hold the wire handle in various positions.

Figure 9 is a partial sectional view of the top portion of a utensil, showing a pivoted looped type of handle engaging a bracket which in turn is welded to the embedded segment in the flange of the utensil through a recess formed in the flange.

The invention as herein disclosed illustrates several forms of attaching the handle or handles to the utensils in such a manner as to accomplish the objects herein set forth.

In the forms shown in Figures 1 to 4, both inclusive, a sheet metal utensil 10 and 11 is fashioned to the desired shape with an upper portion roller or pressed outwardly, then downwardly. In the recess formed by this process of fabrication there is embedded a segment 13 which is held in place by pressing or spinning the overlapping edge of the flange 12 inwardly to a point where it engages the sidewall of the container, thus making a complete closure. Through the outer portion of the flange 12 and midway between the upper and lower parallel surfaces of the flange there is formed a recess 14. Through this recess 14 there is welded direct to the embedded segment 13 a handle stem 15 or a casserole handle 16. The handle stem 15 is intended to be used with a hand grip of wood or composition 17. To prevent a handle of this type from twisting there is pressed on the stem 15 outwardly projecting fins 18 which engage the handgrip portion 17. In order to form a closure at point of weld through the recess 14 on the flange 12, the stem 15 has an upset head 19 adjacent to its welding point which also adds to its strength and appearance.

Figure 3 illustrates the conversion of two utensils into a double boiler. To accomplish this the flange portion 12 of the nesting saucepan 10 and the flange portion of the deeper saucepan 11 have substantially the same diameter of flanges 12, the lower surface of the flange on the nesting saucepan 10 has a continuous sealing contact with the top surface of the flange on the deeper saucepan 11 which will prevent effectively the escape of heat or steam.

Figures 5, 6 and 7 illustrate a utensil 20 intended primarily for steam tables and stoves that possess a recess in their tops for housing such utensils. The flange of this utensil 20 is constructed similar to the flanges shown on the utensils, Figures 1 to 4, namely, having a segment 13 crimped or pressed in the flange 12. At opposite sides of flange 12 there are formed recesses 14 through which there is welded to the supporting segment 13 short studs 21, pivoted to the short studs 21 is a bucket type of handle 22 formed so as to lie close to the outer contour of the flange and between the upper and lower parallel sealing surfaces of the flange 12 when the utensil is being used in a steam table or stove and resting on the rim or collar of the recess in the steam table or stove 23. 24 is a formed portion of the handle 22 to serve as a finger grip to lift the handle 22 to its carrying or upright position.

Figure 8 is a partial view of a bucket type of utensil 33 adjacent to where the formed lug 25 is welded to the segment 13 embedded in the flange 12 at top of utensil 33. There are two such lugs 25 placed at opposite sides on the flange 12. This lug 25 is formed with an eyelet 26 through which a conventional wire bucket handle 27 is fastened. Adjacent to the eyelet 26 on the lug 25 there is formed grips or notches 28 and 29 to engage the wire handle 27 to hold it in various positions.

Figure 9 is a part view of a utensil 30 having a looped handle 31, which are in pairs, this looped handle is pivoted to an attaching bracket 32 by pin 33. The bracket 32 is formed so as to be welded to the retaining segment 13 through the recess 14 formed in the flange 12 and lying between the upper and lower sealing surfaces of the flange.

From the foregoing description of the several details of the invention it would be observed that the flange portion of these receptacles is constructed in such manner as to tightly grip and enclose the segment to which the handle attachments are welded, and that the receptacle is carried and supported by this segment. This construction possesses unusual strength and rigidity, which will prevent to a large degree the flange from becoming distorted and misshapen. By this process of fabrication there is no obstruction below the flange of the utensil, and the upper and lower parallel surfaces of the flange give a uniform and continuous sealing contact around their entire surfaces, this construction makes possible the conversion of two utensils into a very efficient double boiler, or a combination of nesting utensils. When utilized in connection with a double boiler, the inner and outer receptacles are so shaped and designed that the upper flange on both receptacles are substantially of the same diameter. This arrangement permits an interchange of receptacles of any given diameter and also provides for the use of a single lid for either receptacle, this lid in any case providing a continuous seal or closure for the receptacle. As a double boiler these receptacles can be used separately or together, and can be sold separately or together as each one is a complete unit in itself.

For steam tables and stoves possessing cavities in their tops for housing a receptacle, the bucket type of handle will add greatly to efficiency and convenience, as two receptacles can be carried at the same time by one person, one in each hand, and when the handle is swung down it lies between the top of the stove or steam table and the upper surface of the flange of the receptacle well out of the way.

The bucket type of receptacle having formed lugs to engage the conventional wire handle is especially adapted to household use, dairies, and in industry where strength, sanitation, and ease of cleaning become factors of prime importance.

What I claim is:

1. A utensil having at its rim a continuous and uninterrupted flange structure formed into outwardly, downwardly and inwardly extending sections completely housing a segment embedded therein, an opening formed in the downward section of said flange structure and between the planes of the outwardly and inwardly extending sections so as to expose a portion of the outer surface of said segment, a handle lug formed with an extension to substantially fill said opening in said flange structure, and permanent attaching means to hold said extension on said lug in direct contact with the exposed portion of said segment independently of said flange structure.

2. A utensil having side walls terminating in a flange formed into outwardly, downwardly and inwardly extending sections to house a segment embedded therein, the outer walls of said segment engaging the inner walls of said flange, an opening formed in the downward section of said flange and between the planes of the outwardly and inwardly extending sections so as to expose a portion of the outer surface of said segment, a bracket having an attaching lug formed to engage the outer surface of said segment by fixed and positive means through the opening formed in the downward section of said flange, a handle pivotally mounted on said bracket and movable around said pivot through a predetermined arc.

JOSEPH B. McMULLEN.